United States Patent
Batarseh et al.

(10) Patent No.: US 9,971,753 B2
(45) Date of Patent: May 15, 2018

(54) COMPUTER SYSTEM PROVIDING COLLABORATIVE LEARNING FEATURES AND RELATED METHODS

(71) Applicant: UNIVERSITY OF CENTRAL FLORIDA RESEARCH FOUNDATION, INC., Orlando, FL (US)

(72) Inventors: Issa Batarseh, Oviedo, FL (US); Ozlem Garibay, Oviedo, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 11 days.

(21) Appl. No.: 15/174,196

(22) Filed: Jun. 6, 2016

(65) Prior Publication Data
US 2016/0357721 A1 Dec. 8, 2016

Related U.S. Application Data

(60) Provisional application No. 62/170,865, filed on Jun. 4, 2015.

(51) Int. Cl.
*G06F 17/24* (2006.01)
*G06F 3/0483* (2013.01)
(Continued)

(52) U.S. Cl.
CPC .......... *G06F 17/241* (2013.01); *G06F 3/0483* (2013.01); *G06F 17/218* (2013.01);
(Continued)

(58) Field of Classification Search
CPC .. G06F 3/0483; G06F 17/218; G06F 17/2247; G06F 17/2264; G06F 17/241; G09B 5/02
(Continued)

(56) References Cited

U.S. PATENT DOCUMENTS 8,352,876 B2   1/2013  Batarseh et al.
8,478,662 B1 *  7/2013  Snodgrass .............. G06Q 30/02
                                                  705/26.1
(Continued)

OTHER PUBLICATIONS

Amarin et al.; Importance of Practical Relevance and Design Modules in Electrical Circuits Education; Apr. 4-6, 2010; 2011 IEEE Global Engineering Education Conference (EDUCON)—"Learning Environments and Ecosystems in Engineering Education;" pp. 792-796.*

(Continued)

*Primary Examiner* — Andrew R Dyer
(74) *Attorney, Agent, or Firm* — Allen, Dyer, Doppelt & Gilchrist, P.A.

(57) ABSTRACT

A computer system may include a server(s) for storing electronic textbook data and a plurality of computing devices each including a display, a memory, a user input device, and a processor. The processor may display the electronic textbook data on the display, receive comment data from a respective user of the computing device with respect to the electronic textbook data, and provide the comment data to the server(s). The server(s) may be configured to distribute the comment data among the plurality of computing devices. The processor of each computing device may be configured to receive a respective user rating for the distributed comment data and provide the user rating to the server(s). The server(s) may be configured to permanently incorporate given distributed comment data into the electronic textbook data when the user ratings for the given distributed comment data reach a rating threshold.

16 Claims, 9 Drawing Sheets

(51) Int. Cl.
G09B 5/02 (2006.01)
G06F 17/21 (2006.01)
G06F 17/22 (2006.01)

(52) U.S. Cl.
CPC ...... *G06F 17/2247* (2013.01); *G06F 17/2264* (2013.01); *G09B 5/02* (2013.01)

(58) Field of Classification Search
USPC .................................................. 715/230, 234
See application file for complete search history.

(56) References Cited

U.S. PATENT DOCUMENTS

| | | | | |
|---|---|---|---|---|
| 8,606,792 B1* | 12/2013 | Jackson | ............ | G06F 17/30699 707/748 |
| 8,650,476 B1* | 2/2014 | Belle | ............ | G06F 17/241 705/26.35 |
| 8,706,685 B1* | 4/2014 | Smith | ............ | G06F 17/30882 707/608 |
| 8,812,528 B1* | 8/2014 | Pedregal | ............ | G06Q 50/01 707/758 |
| 8,825,083 B1* | 9/2014 | Pedregal | ............ | G06Q 30/0269 455/456.3 |
| 8,825,759 B1* | 9/2014 | Jackson | ............ | H04L 67/02 705/14.69 |
| 8,832,062 B1* | 9/2014 | Pedregal | ............ | G06F 17/30038 707/706 |
| 8,832,127 B1* | 9/2014 | Pedregal | ............ | G06Q 10/10 707/706 |
| 8,832,191 B1* | 9/2014 | LeBeau | ............ | H04L 51/10 382/209 |
| 8,903,852 B1* | 12/2014 | Pedregal | ............ | G06F 17/30864 707/707 |
| 8,990,235 B2* | 3/2015 | King | ............ | G06F 17/2211 707/759 |
| 9,116,654 B1* | 8/2015 | Shah | ............ | G06F 3/14 |
| 9,251,130 B1* | 2/2016 | Lynnes | ............ | G06F 17/241 |
| 9,323,733 B1* | 4/2016 | McGhee | ............ | G06F 17/241 |
| 9,430,776 B2* | 8/2016 | Puppin | ............ | G06F 17/218 |
| 2004/0139400 A1* | 7/2004 | Allam | ............ | G06F 17/212 715/201 |
| 2009/0327855 A1* | 12/2009 | Le | ............ | G06F 17/30882 715/230 |
| 2011/0153599 A1* | 6/2011 | Hillis | ............ | G06F 17/3089 707/723 |
| 2012/0136939 A1* | 5/2012 | Stern | ............ | G06Q 10/107 709/206 |
| 2012/0191764 A1* | 7/2012 | Leibu | ............ | G06Q 30/02 707/821 |
| 2012/0218305 A1* | 8/2012 | Patterson | ............ | G06F 17/2235 345/652 |
| 2013/0177892 A1 | 7/2013 | Batarseh et al. | | |
| 2013/0179823 A1 | 7/2013 | Batarseh et al. | | |
| 2013/0198277 A1* | 8/2013 | Pedregal | ............ | G06Q 30/0282 709/204 |
| 2013/0246128 A1* | 9/2013 | King | ............ | G06F 17/3061 705/7.35 |
| 2013/0246157 A1* | 9/2013 | Puppin | ............ | G06Q 30/02 705/14.36 |
| 2013/0268826 A1* | 10/2013 | Nowakowski | ............ | G06F 17/2288 715/203 |
| 2014/0280195 A1* | 9/2014 | Etzioni | ............ | G06F 17/30997 707/741 |
| 2014/0288686 A1* | 9/2014 | Sant | ............ | G11B 27/038 700/94 |
| 2015/0120840 A1* | 4/2015 | Rostocil, Jr. | ............ | H04L 51/04 709/206 |
| 2016/0026351 A1 | 1/2016 | Batarseh et al. | | |
| 2016/0027315 A1 | 1/2016 | Batarseh et al. | | |

OTHER PUBLICATIONS

Dahlstom et al.,"ECAR: National study of Undergraduate Students and Information Technology", EDUCAUSE, Center for Applied Research, 2011; pp. 35.

L. Bridges, "Face-to-Face on Facebook: Students are there . . . Should we be?", Teaching Generation M, Neal-Schuman Publishers, Inc., 2009; pp. 125-136.

S. Hussman, "Effective teaching and learning in engineering education using a novel web-based tutorial and assessment tool for advanced electronics," International Journal of Engineering Education, vol. 20, 2004; pp. 161-169.

G. Haddad, "Interactive electrical circuit tutoring tool-eTutor," ASEE Southeast Conference, 2008; pp. 10.

Batarseh et al. "Development of modular interactive learning and assessing tools for electrical circuit core courses for engineering students", 2011 CCLI/TUBS Conference, Washington DC: Jan. 26-28, 2011; pp. 14.

M.J. Mayo, Video Games: A Route to Large-Scale STEM Education?, Science, 2009; pp. 79-82.

K. Carey "A Future Full of Badges", http://chronicle.com/article/a-future-of-badges/131455:The Chronicle of Higher Education, 2012; pp. 6.

McGourthy et al., "Development a comprehensive assessment program for engineering education", Journal of Engineering Education, ASEE, 87(4), Oct. 1998; pp. 355-362.

B. Olds et al., "Assessment in engineering education: Evolution, approaches and collaborations," Journal of Engineering Education, vol. 94, Jan. 2005, pp. 13-25.

M. Prensky, "Digital Natives, Digital Immigrants", On the Horizon, MCB University Press, 2001; pp. 6.

H. Jenkins, "Confronting the Challenges of Participatory Culture: Media Education for the 21 Century", The MacArthur Foundation, 2006; pp. 145.

"Author Information Unavailable" "Social Network Sites: My Definition.", http://www.zephoria.org/thoughts/archives/2006/11/10/social network-2.html; 2006; pp. 2.

* cited by examiner

TREE 1

FIG. 4

TREE 2

COMPUTER SYSTEM PROVIDING COLLABORATIVE LEARNING FEATURES AND RELATED METHODS

RELATED APPLICATIONS

This application claims the benefit of provisional application Ser. No. 62/170,865 filed Jun. 4, 2015, which is hereby incorporated herein in its entirety by reference.

TECHNICAL FIELD

The present disclosure generally relates to computing devices, and more particularly to systems and devices which may be used to provide interactive or collaborative learning for multiple users.

BACKGROUND

A recent national study (E. Dahlstrom, T. de Boor, P. Grunwald and M. Vockley, "ECAR: National study of Undergraduate Students and Information Technology", EDUCAUSE, Center for Applied Research, 2011) shows that 90% of all undergraduate students use social networking sites as a communication tool, with 58% of students self-reporting that they learn better in blended learning environments: classrooms with some online components. Moreover, the current generation of undergraduate students live in a networked world and communicate differently than previous generations. See M. Ito, H Horst, M. Bittanti, etc. "Living and learning with New Media: Summary of Findings from the Digital Youth Project," November 2008.

Typical material in science, technology, engineering and mathematics (STEM) textbooks presented to this generation may be too abstract for many students with little or no interactivity between mathematical and graphical representations and lack of feedback on one hand, and outdated text material on the other hand. This may result in a disconnect between the technical concepts and how they fundamentally relate to the STEM content. Such disconnect may result in misconceptions that students will harbor for a long time and that will cause them difficulties as they venture to more advanced STEM courses.

SUMMARY

A computer system may include at least one server for storing electronic textbook data and a plurality of computing devices each including a display, a memory, a user input device, and a processor cooperating with the memory, the display, and the user input device to display the electronic textbook data on the display, receive comment data from a respective user of the computing device with respect to the electronic textbook data, and provide the comment data to the at least one server. The at least one server may be configured to distribute the comment data among all of the plurality of computing devices. The processor of each computing device may be configured to receive a respective user rating for the distributed comment data and provide the user rating to the at least one server. The at least one server may be configured to permanently incorporate given distributed comment data into the electronic textbook data when the user ratings for the given distributed comment data reach a rating threshold.

More particularly, the at the at least one server may be further configured to store the user comments and associated user ratings in a database and calculate respective levels of recognition for the users based upon their stored user comments and the associated user ratings. Moreover, the processor of each computing device may be further configured to provide a location within the electronic textbook data being displayed on the display to the at least one server, and the at least one server may be configured to share location information among all of the plurality of computing devices. As such, the processor of each computing device may be configured to display an indicator to a respective user of other users currently viewing the same location on other computing devices.

Furthermore, the electronic textbook data may be organized in a database object tree with parent objects and respective child objects under each parent object. More particularly, the child objects may be further organized in a database style tree for a plurality of different styles, with child objects from different parent objects sharing a same style. Moreover, the different styles may comprise at least one of textbook problem styles and textbook figure styles.

The electronic textbook data may comprise a plurality of objects with respective unique object identifiers (IDs), and the processor and memory of each computing device may cooperate to download a portion of the objects of the electronic textbook data from the at least one server in a forward-skewed cache including more objects in a forward browsing direction than in a backward browsing direction. More particularly, the processor may only download objects to the forward-skewed cache when a user is reading already rendered electronic textbook data. By way of example, the processor may load more objects in the forward browsing direction when $$\text{CurrentObjectID} > \text{FirstObjectID} + (\text{CacheSize} * \text{FCThreshold}),$$

where CurrentObjectID is the ID of a current object being browsed from the cache, FirstObjectID is the ID of a first object in the cache, CacheSize is the total number of objects in the cache, and FCThreshold is a forward caching threshold ahead of the CurrentObjectID. Furthermore, the processor may load more objects in the backward browsing direction when $$\text{CurrentObjectID} < \text{FirstObjectID} + (\text{CacheSize} * \text{BCThreshold}),$$

where BCThreshold is a backward caching threshold behind the CurrentObjectID.

A related method is also provided which may include storing electronic textbook data on at least one server. At a plurality of computing devices each including a display, a memory, a user input device, and a processor, the method may further include using the processor to display the electronic textbook data on the display, receive comment data from a respective user of the computing device with respect to the electronic textbook data, and provide the comment data to the at least one server. The method may further include, at the at least one server, distributing the comment data among all of the plurality of computing devices. In addition, the method may also include, at the processor of each computing device, receiving a respective user rating for the distributed comment data and providing the user rating to the at least one server. The method may additionally include, at the at least one server, permanently incorporating given distributed comment data into the electronic textbook data when the user ratings for the given distributed comment data reach a rating threshold.

A related server is for use with a plurality of computing devices each including a display and a user input device. The server may include a memory and a processor cooperating therewith to store electronic textbook data, receive comment data from respective users of the computing devices with respect to the electronic textbook data via the user input devices, and distribute the comment data among all of the plurality of computing devices. The processor may further receive respective user ratings for the distributed comment data via the user input devices, and permanently incorporate given distributed comment data into the electronic textbook data when the user ratings for the given distributed comment data reach a rating threshold.

DETAILED DESCRIPTION

Generally speaking, the present disclosure relates to a computer system, devices, methods, and related software (e.g., non-transitory computer-readable medium) which provide for an electronic book or textbook through which information may be shared among multiple different users of the textbook, such as through social media interfaces. This platform or framework may be used to provide new education materials and teaching strategies with the help of a new software platform for social digital technical book framework with social media tools for the collaborative learning of engineering or other students, for example. This framework may enable global interaction among users, such as engineering students and instructors across the globe, for example, in order to facilitate learning. These interactions effectively build a virtual community of readers that impact the learning process in multiple ways such as enabling the constant improvement of educational material via reader feedback and reader contributed material; and enabling readers to collaborate, share knowledge and experiences, and provide mutual support.

Different types and levels of textbooks may be run on the proposed framework. The framework may be used to enhance the success rate of students, particularly in difficult technical classes, for example (although it may be used in various educations and non-educational applications as well). The platform may provide a social digital book framework enhanced with collaboration and social media tools for engineering students, and may be based upon a Java™ social digital textbook framework for various hardware and software platforms, although other suitable frameworks may also be used. The platform may help connect the four cornerstones of the academic process (teach, student, work and collaboration, interaction among students), for example.

An example implementation for an Electrical Circuit Analysis course, the electronic textbook may include four self learning modules, namely TUTORME, QUIZME, Design and Practical Relevance modules (although it may be used with other subjects and courses as well). TUTORME may help students understand the basic concept, and help the teacher to evaluate student's performance and provide feedback. The Design module may help students with practical design problems and practical relevance module which helps students learn about real world applications. The social digital technical textbook framework may be reused, and the content developed by the collaborative learning community may remain available for new students (e.g., subsequent classes using the electronic textbook) to use and further improve. The framework may be used to create any number of social digital technical books. The platform may serve as a standard globally interactive and collaborative environment for education using social media.

By way of example, the electronic textbook platform may be implemented via a server(s) and a plurality of computing devices (e.g., PCs, Macs, tablet computers, laptops, smart phones, etc.). Electronic textbook data may be stored on the server, or a cloud, and accessed remotely by the computing devices, and/or stored locally on the electronic devices. The platform may be particularly useful for primary and secondary academic textbooks, particularly science, technology, engineering and mathematic (STEM) courses, but may be used for other academic applications, as well as non-academic applications.

Figure 9:
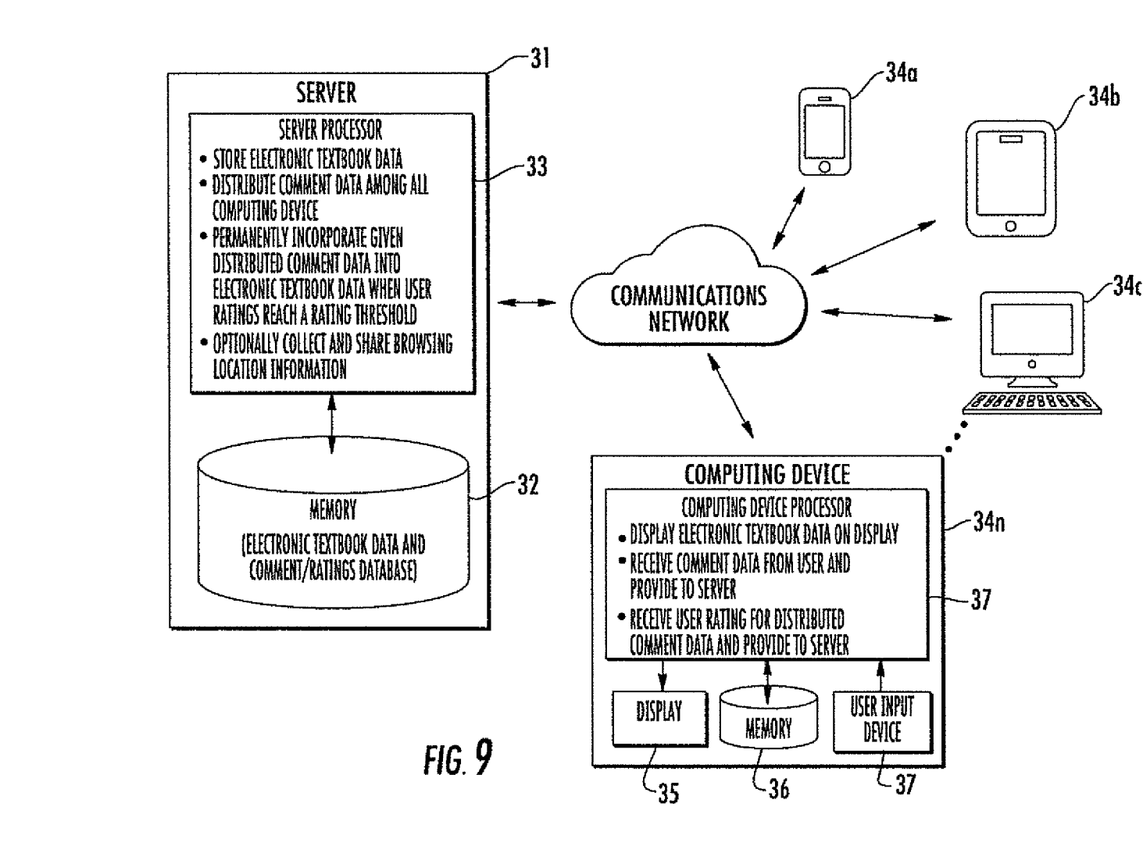
FIG. 9 is a schematic block diagram illustrating a digital textbook computing system in accordance with an example embodiment.
Figure 10:
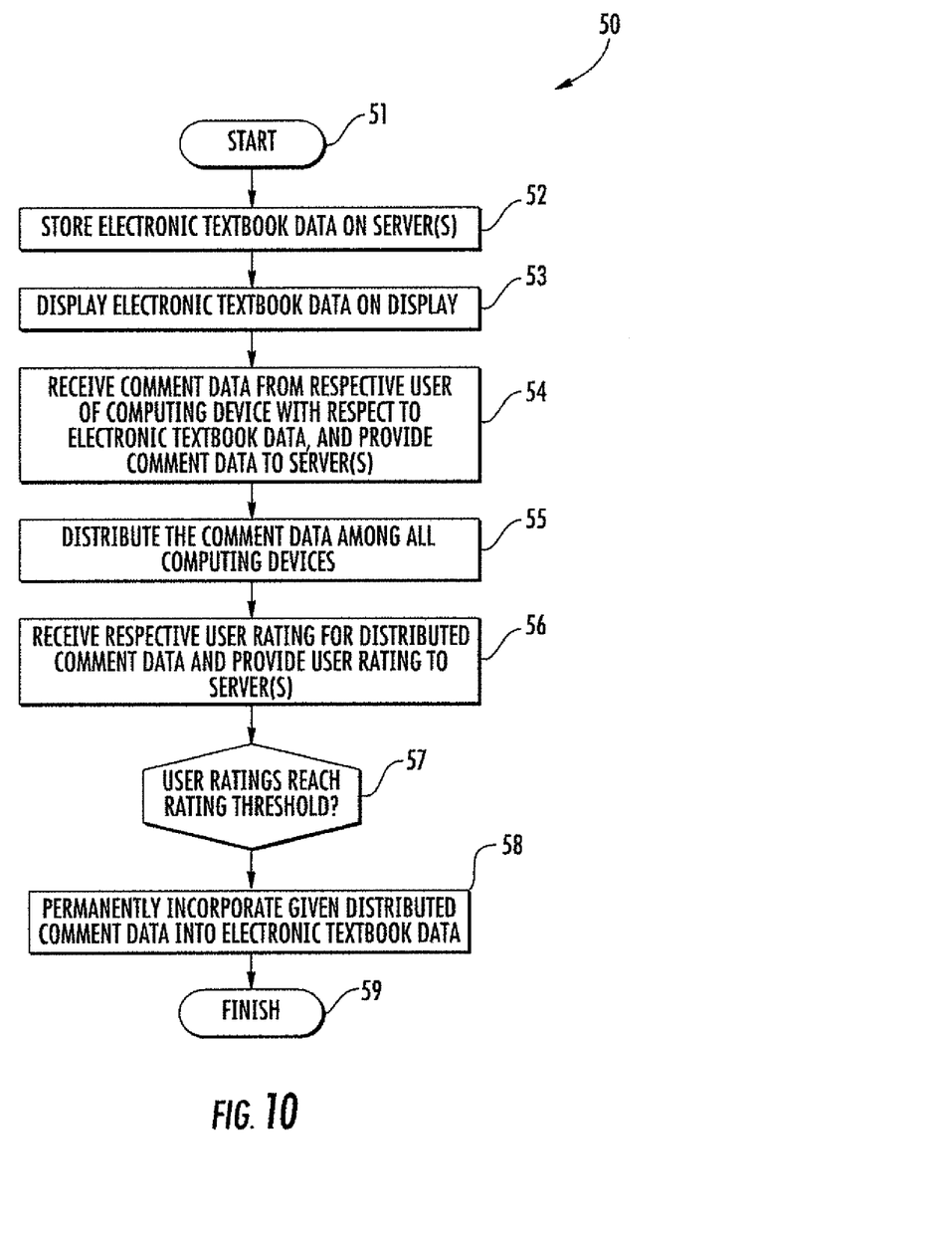
FIG. 10 is a flow diagram illustrating method aspects associated with the system of FIG. 9.

Referring initially to a digital textbook computer system 30 of FIG. 9 and the flow diagram 50 of FIG. 10, the system illustratively includes one or more servers 31 having a memory 32 and a server processor 33 cooperating therewith to store electronic textbook data in the memory (Blocks 51-52). By way of example, the textbook data may be for a STEM textbook, and a specific example relating to an electrical circuit textbook is provided below. However, it will be appreciated that other types of textbooks (literature, history, arts, etc.) may also be used in accordance with the system and method set forth herein. Furthermore, the server (s) 31 may be part of a distributed or cloud computing network in some embodiments, but in other embodiments it may be a dedicated or local server(s) (e.g., located at a respective university, etc.).

The system further illustratively includes a plurality of computing devices 34a-34n, each including a respective display 35, memory 36, user input device(s) 37 (e.g., keypad, mouse, touch screen, menu button, etc.) and a processor 37 cooperating with the memory, the display, and the user input device. Note that only the display 35, memory 36, user input device(s) 37, and processor 37 of the computing device 34n are specifically shown in FIG. 9 for clarity of illustration. Various types of computing devices 34a-34n may be used, such as smart phones, tablets, and desktop/laptop computers, for example. Operation of the computing device 34n will be discussed herein, but it will be understood that the other computing devices 34a-34c may operate similarly in the system 30.

The processor 37 may be configured to download and display the electronic textbook data on the display 35, at Block 53, receive comment data from the respective user of the computing device 34n with respect to the electronic textbook data via the user input device 37, and provide the comment data to the server 31, as will be discussed further below (Block 54). The server 31 may be configured to distribute the comment data from each of the computing devices 34a-34n among all of the computing devices, at Block 55. The processor 37 of each computing device 34a-34n may be configured to receive a respective user rating for the distributed comment data via its user input device 37 and provide the user rating to the server 31, at Block 56. The server may be further configured to permanently incorporate given distributed comment data into the electronic textbook data when the user ratings for the given distributed comment data reach a rating threshold (e.g., an average of at least 4.5/5 stars based upon a minimum number of reviews), at Blocks 57-58, as will also be described further below. The method of FIG. 10 concludes at Block 59.

Further details on the electronic or digital textbook platform and collaborative features thereof are now provided. It should also be noted that the platform may be applied within a given class, across multiple classes in a same school or university, as well as between different classes in different schools or universities in different geographical areas (either in the same or different countries). Moreover, the platform may allow students to view where other students are in the electronic textbook, such as by displaying in a window an identification of other users studying a similar passage or section at a location in the electronic textbook to facilitate communication and discussion therebetween.

As noted briefly above, a recent national study (Educause ECAR 2011) shows that 90% of all undergraduate students use social networking sites as a communication tool, with 58% of students self-reporting that they learn better in blended learning environments: classrooms with some online components. Therefore, given the recent advances made in software engineering and web-enabled social networking technologies, there is a need for new educational tools & platforms and teaching strategies that science, technology, and engineering (STEM) students, for example, may use to learn complex engineering and scientific theory and technical tools that provide (a) interactive feedback to assist in personal learning, and (b) social networking to assist in collaborative learning. Also there is a need for a fully structured methodology to formulate effective strategies that help engineering students learn, retain and apply different and complex technical formulation to solve STEM problems.

In addition, the current generation of undergraduate studies lives in a networked world and communicate differently than previous generations (Digital Youth Project, Ito 2008). This generation is digital native. See M. Prensky, "Digital Natives, Digital Immigrants", On the Horizon, MCB University Press, 2001. They are highly connected and perform best when they are networked. They prefer games and instant rewards to work. The generation of digital natives is in their online communities. Educators need to be where this generation is and integrate learning into their online communities and take advantage of their participatory culture. L. Bridges, "Face-to-Face on Facebook: Students are there . . . Should we be?", Teaching Generation M, Neal-Schuman Publishers, Inc., 2009. The digital youth of participatory culture work together in groups toward a common goal or knowledge or shape the media participate in communities. The members of this culture have the ability to bring about collective intelligence and use good judgment to distinguish the credible information, network to search, obtain and disseminate information. H. Jenkins, "Confronting the Challenges of Participatory Culture: Media Education for the 21$^{st}$ Century", The MacArthur Foundation, 2006.

Typical material in STEM textbooks presented to this generation is too abstract for many students with little or no interactivity between mathematical and graphical representations and lack of feedback on one hand, and outdated text material on the other hand. This result in a total disconnect between the technical concepts and how they fundamentally relate to the engineering content. Such disconnect results in student misconceptions they will harbor for a long time and that will cause them difficulties as they venture to more advances STEM courses. S. Hussmann, G. Covic, and N. Patel, "Effective teaching and learning in engineering education using a novel web-based tutorial and assessment tool for advanced electronics," International Journal Of Engineering Education, vol. 20, 2004, pp. 161-169.

To address the above engineering educational needs, the present disclosure provides for a social digital framework that may run across different digital platforms (such as PCs, Mac, iPods, iPhones and internet/online etc.) and different software platforms (Windows, Mac OS, embedded systems etc.). The application may be portable to platforms that are not native to Java based applications such as iPhone or iPad etc. by cross-compiling them using a translation of bytecode or compatibility layer. This may be implemented in Java to maintain the platform-independence features, enhanced features and performance. This framework may improve engineering education by introducing interactivity (reader-book) and collaboration (reader-reader) as tools for learning. This will allow any Java-enabled platforms (such as laptops, desktops and small handheld devices) to display digital technical engineering educational books with the classical look and feel of a traditional book, yet with the amenities of the digital world such as searches, links, highlights, bookmarks and automatically generated questions and examples that targets different student levels.

Figure 1:
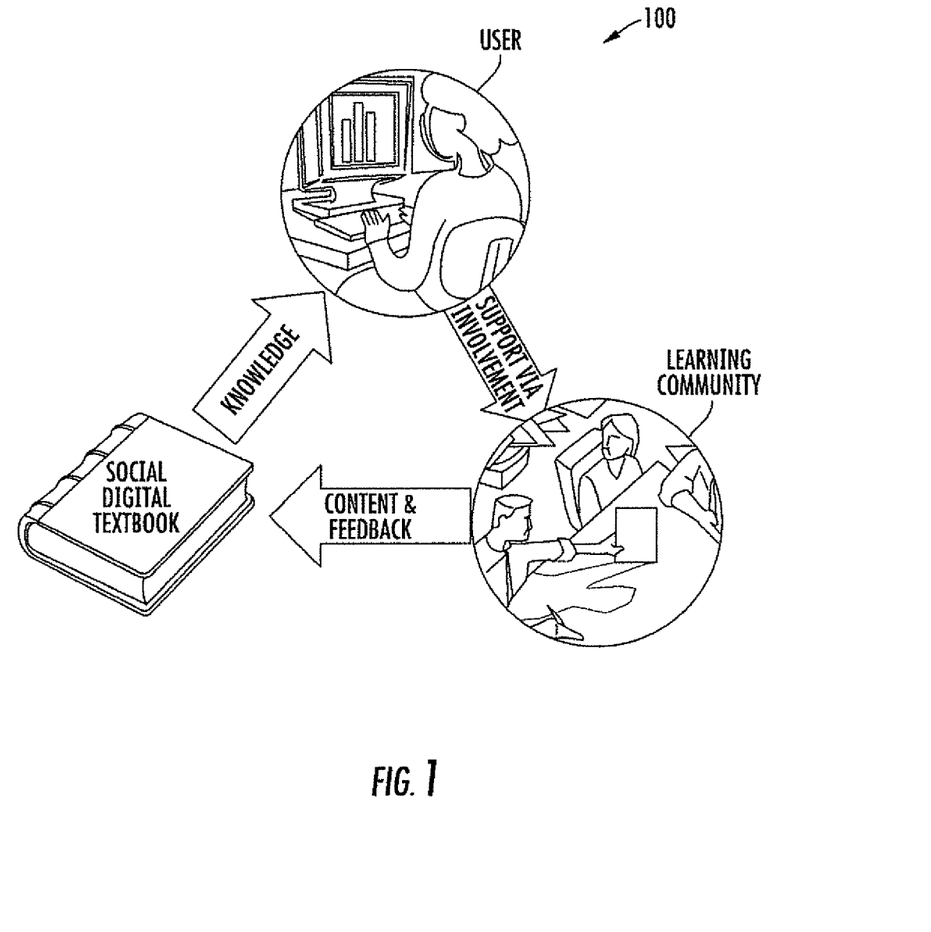
FIG. 1 is a schematic flow diagram illustrating knowledge transfer and support using a digital textbook computing system in accordance with an example embodiment.

These interactions effectively build a virtual community of readers that impact the learning process in multiple ways such as enabling the constant improvement of educational material via reader feedback and provide mutual support. This interaction is illustrated in the flow diagram 100 of FIG. 1. Social digital textbook enables users to form learning communities by providing social media tools and knowledge via textbook material. User involvement creates and sustains learning communities. Finally, learning communities provide user generated content and feedback to improve the social digital textbook. This interaction generates a positive feedback loop of knowledge. Each time around the loop: knowledge is improved by a better textbook content, a more knowledgeable user provides higher quality involvement, and a stronger community contributes better user generated content and feedback.

An example implementation of the social digital book will be described herein for an "Electrical Circuit Analysis" course. However, the social digital textbook framework may be used to render any technical book content into a social digital technical textbook that provides the course material in an interactive environment powered with social media tools.

Social media refers to Internet-based applications that are used to generate and share content via the internet. The social media tools in this proposal are similar to that of Facebook and Wiki, and allow users to interact with other users, exchange information, provide content to the textbook, form teams to work on common goals such as solving problems, doing projects etc. For illustrational purposes, the circuit analysis textbook based on the proposed framework will include four consecutive and self-learning modules. The first of these modules is the TUTORME module (see G. Haddad, G. Gamboa, and I. Batarseh, "Interactive electrical circuit tutoring tool-eTutor," ASEE Southeast Conference, 2008), which helps students understand the basic concepts in a step-by-step manner using a gradual analysis of key circuit concepts. The second module is the QUIZME module (see "Importance of practical relevance and design modules in electrical circuits education", R. A Amarin, K. B. Sundaram, A. Weeks, and I. Batarseh, 2011 IEEE Global Engineering Education Conference, EDUCON 20 II, April 4-6, p 792-794), which assesses the students' understanding of the concepts, helps instructors to evaluate student performance and offers a constructive feedback to the student. The third module is the Design module, which helps students with practical design problems in the given section. The fourth module is the Practical Relevance module, which helps students learn about real world applications and products associated with the electrical circuit concepts. "Development of modular interactive learning and assessing tools for electrical circuit core courses for engineering students", Issa Batarseh and Kalpathy B. Sundaram, 20 II CCLI/TUBS Conference, Jan. 26-28, 2011, Washington D.C.

Figure 2:
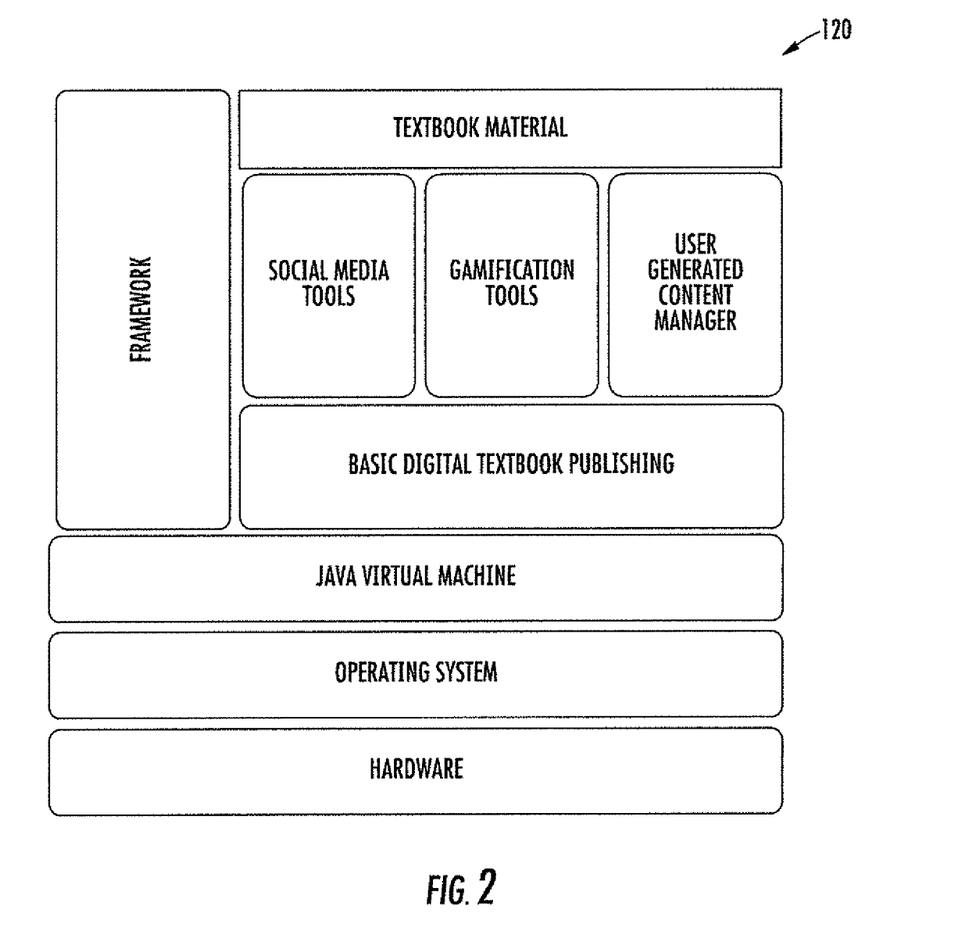
FIG. 2 is a schematic block diagram illustrating a network level framework for an example digital textbook computing system in accordance with an example embodiment.

The Java™ based social digital technical textbook framework may be for different digital platforms (such as PCs, Mac, iPods, iPhones and internet/online etc.) and different software platforms 120 (Windows, Mac OS, embedded systems etc.) as shown in FIG. 2. The application may be portable to platforms that are not native to Java based applications such as iPhone or iPad, etc., by cross-compiling them using a translation of bytecode or compatibility layer. This may provide a platform that promotes interaction among the text book, the student and the teacher in addition to the interaction among the students to provide support and mentoring they need to catch up with the coursework. This may also allow the content of the textbook to be updated by students and the teacher to meet the current needs and standards.

The social digital technical textbook framework may be a Java™ based digital technical textbook framework. A social network may be implemented around this framework, which may include a user generated content tool and a reward system to promote student involvement and interaction. The user generated content tool may be a wiki-like environment where students may provide content for the textbook and rate the other user generated content. Based on the ratings by the other students or the instructor, the content provided by students may become a permanent part of the book. This may promote active and constructive participation and collaboration among the students, rather than students being the passive individualistic consumers of the knowledge provided to them. R. Mason and F. Rennie, "E-Learning and Social Networking Handbook: Resources for Higher Education", Routledge, 2008. This tool may also allow the content to be continuously improved and updated.

In accordance with one example, the programming language and database system may be based on the Java™ programming language. This Java platform is standardized and platform independent as the digital Book is proposed to be globally interactive; this includes different hardware platform (PC, Apple, handheld devices, iPhones, etc.) and different software platforms (windows, Macs, embedded systems with Java support). Thus, the proposed Book may also operate in online mode. By way of example, Java Apache Derby relational database system may be used for the system data storage and graphical user interface (GUI data base). This database has desired embedded properties, relational characteristics, enhanced performance and portability environment features. Apache Derby is a Java relational database system with the above properties and may be embedded into Java programs. It has a very small disk space format and is portable as Java. However, other programming languages and platforms may be used in different embodiments.

Figure 3:
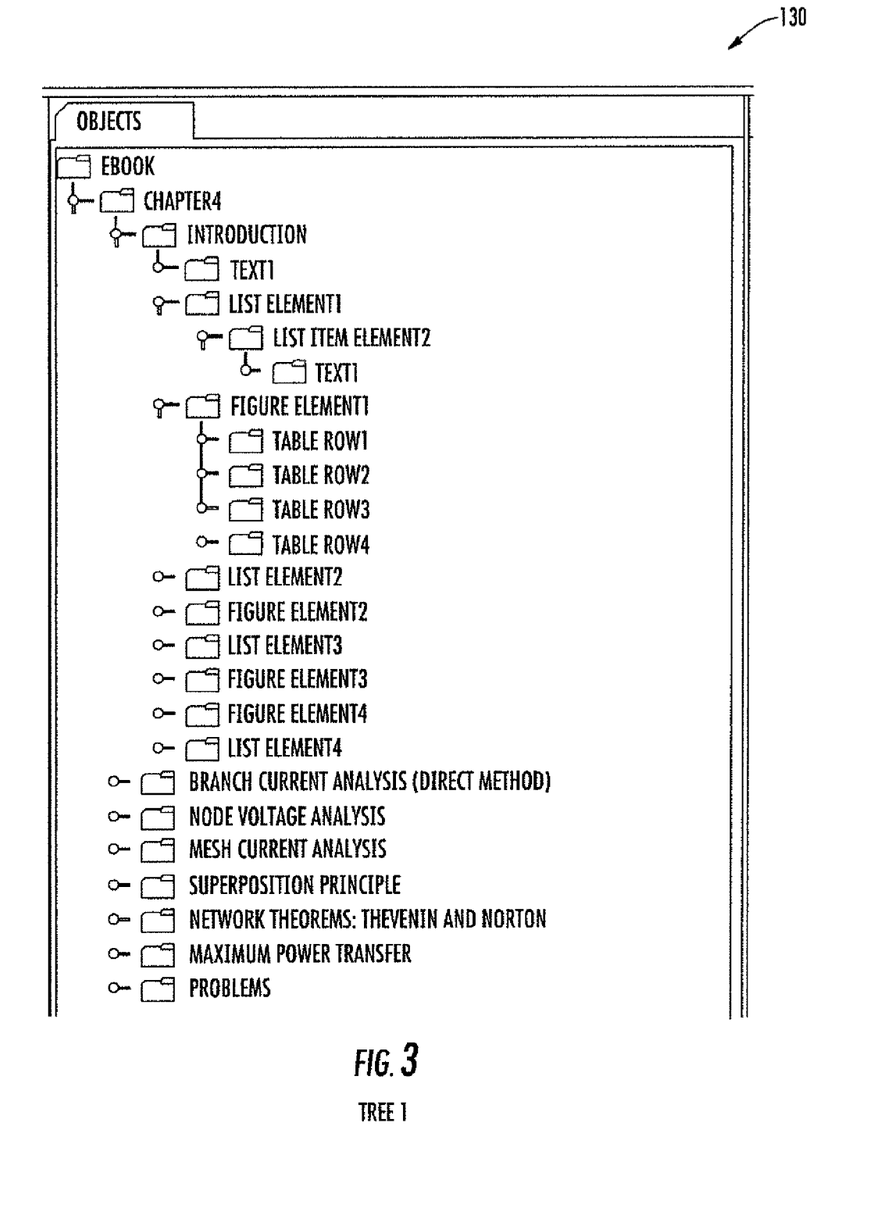
FIGS. 3 and 4 are screen prints of object and style trees, respectively, which may be used with an example digital textbook computing system in accordance with an example embodiment.
Figure 4:
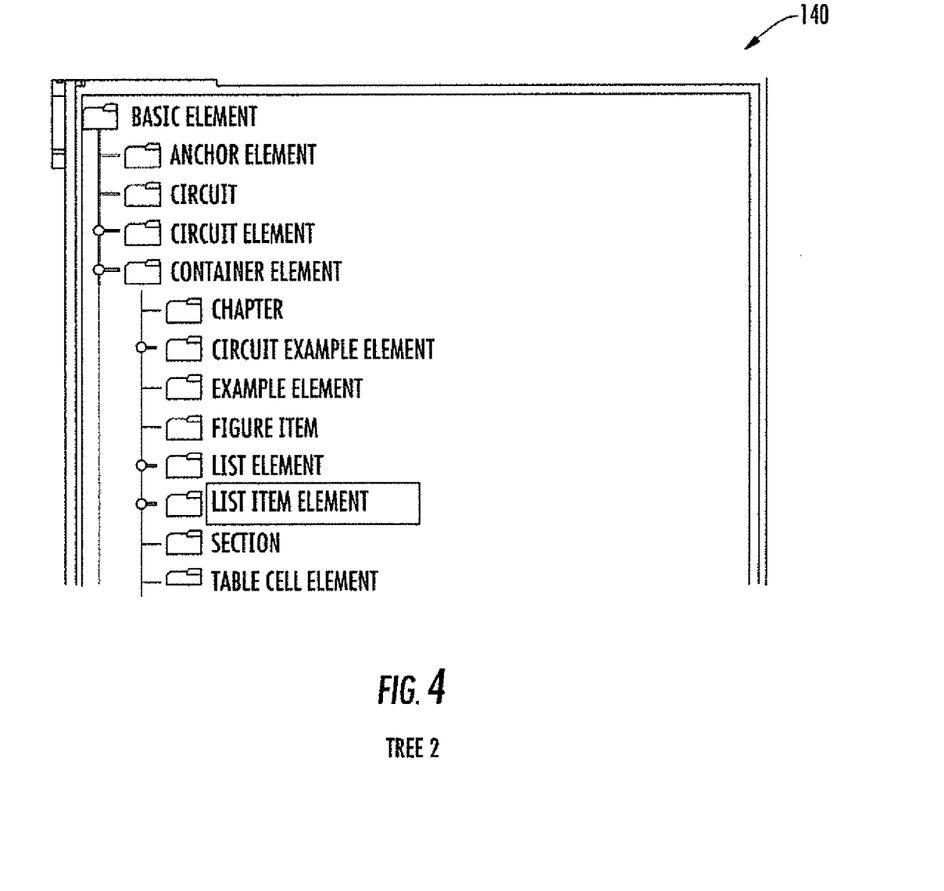

With respect to system data structures, tree data structures as shown in FIGS. 3 and 4 may be used to achieve a certain level of flexibility in the system. The object tree 130 represents the content layout of the system implemented in a tree data structure. The tree hierarchy maps to the table of contents of the represented book. The children of one node respect a predefined sequential appearance which represents the order of their occurrence in the book. The tree shows the root node with one node as a child; all sections of the Chapter appear as children of that node.

The synthesized styles tree 140 represents the object styles categorized by the object hierarchy. The objects are built using a predefined hierarchical structure, as shown in FIGS. 3 and 4. It shows a sample styles hierarchy tree. For example, the Basic Element is a parent for all objects in the system. The Container Element is child for the Basic Element, and so, the Container Element collects style properties from itself and from its parent, the Basic Element in this case. The same concept applies to the List Item Element for example, which is a child for the Container Element. The List Item Element shares properties from itself as well as its parents.

The Inherited Styles Tree defines the behavior of a certain style property when the object of interest is in a certain location at the objects tree. This tree is introduced to resolve the problem of the ability to have a certain object under more than one possible parent in the objects tree. For example, an object of type X may exist under Object A or Object B in the Objects tree. The publisher might desire a certain style of Object X to behave according to its parent type in the Objects tree. This tree lists only the objects with two or more possible parents in the Objects tree, for example, and it then defines the style inheritance rules of that object, that is, how a certain style behaves under certain parent node. All operations done on the trees will be performed using a special tool called the publisher. The publisher is a publishing tool that may allow the user to perform the following actions: (1) Manual insert of book content, (2) Automatic insert of book content, using specially tagged MSWord or PDF files, (3) Examine results on the fly while inserting content, (4) Manipulate synthesized and inherited style trees, (5) Import/Export book contents into XML (this allows easy backup and restoration of e-book data), and (6) Organize set of object styles into themes and make themes available for the user from the e-book interface.

The social digital book may provide an efficient framework in terms of speed and response time. This eBook device may to efficiently render and preview the book material for the students without any noticeable delay. Considering that the material-fetching demand may be very high in some context-rich books, the need for a caching scheme may be significant.

A cache is a temporary storage area where frequently accessed data can be stored for rapid access. Once the data is stored in the cache, it may be used in the future by accessing the cached copy rather than re-fetching or re-computing the original data.

Figure 5:
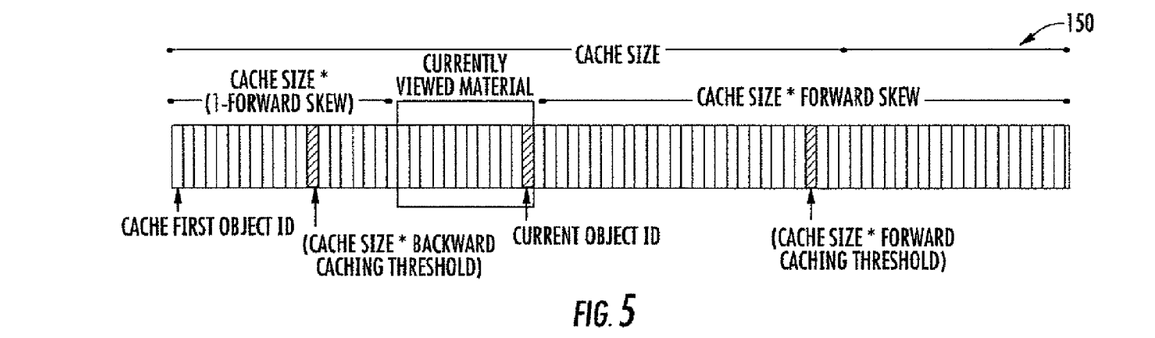
FIG. 5 is a schematic block diagram of a forward-skewed cache which may be used with an example digital textbook computing device in accordance with an example embodiment.

The eBook device may advantageously include a cache 150, as shown in FIG. 5, that fills when the student is busy reading the already-rendered material. Such a conservative algorithm will not consume the CPU resources when needed by the user, but instead will become active when the CPU utilization is at its lowest level, and this happens when the student is not active in terms of page flipping, but rather occupied reading the displayed material. The cache may include material in the forward and backward browsing direction, as it is not always easy to tell whether the student is going to browse forward or return to another page in a backward direction. However, there exists a tendency to browse forward when someone is reading a technical book as this represents the normal flow of the reading process. Thus, the cache may maintain a forward-skewed window of cached objects that encloses the currently viewed material (i.e., the cache saves or maintains more cached objects in the forward direction).

A challenge is to prevent the cache loading process from continuously oscillating around the currently viewed material. To achieve this, the following scheme may be used: the number of objects loaded in both directions is defined by (CacheSize*ForwardSkew) and (CacheSize*(1−ForwardSkew)). These numbers will be maintained except where not possible to achieve (e.g., start of book or end of book). The cache loading is triggered by another two variables: ForwardCachingThreshold and BackwardCachingThreshold, which represents the fraction of cache size at which the loading process is triggered in both directions, when the caching threshold is hit, the digital book framework will start loading objects until the caching window retains its dimension. The loading process is thus controlled as follows:

Start Loading:CurrentObjectID>CacheFirstObjectID+
CacheSize*ForwardCachingThreshold Stop Loading:CurrentObjectID<CacheFirstObjectID+
CacheSize*ForwardSkew Start Loading:CurrentObjectID<CacheFirstObjectID+
CacheSize*BackwardCachingThreshold Stop Loading:CurrentObjectID>CacheFirstObjectID+
CacheSize*(1−ForwardSkew)

The values of these variables selected to reach stability when the user is browsing the material between (CacheSize*BackwardCachingThreshold) and (CacheSize*ForwardCachingThreshold) at which the cache will not load any new material. The principle of locality tells us that the user will have a tendency to study material within localized boundaries of the book. The cache may help improve the performance of the digital book when localized browsing patterns are encountered (the common case), but will not degrade the performance when other, less common, browsing patterns happen. This is corroborated by the fact the miss penalty in the digital book cache is not so expensive because the caching only occurs when the user is busy reading the already rendered material without issuing any database traffic.

The digital book may also have dynamic floating content uncoupled with pages. That is, the digital book may be run on a computer-based apparatus such as desktops, laptops, and hand-held PCs, tablet computing devices (e.g., iPad, etc.). Those devices cover a wide range of display sizes. The goal is to have a dynamic content that is uncoupled with explicit pages but floating in horizontal and vertical dimensions to adjust to the variable display geometry. To achieve that goal, four components may be used. A first one is content classification. More particularly, content elements are diverse and they range from simple and titled text to images, equations, figures, tables, and many others. Each one of these different classes of content has its own set of properties and hence reacts differently to the dynamic allocation in the free page space. For example, the text has the attributes {font (size, type, bold, italic, underlined), foreground and background colors, vertical and horizontal alignment, margins, etc.}, and it has the flexibility to wrap across variable line widths and clip to next pages. On the other hand, the image has the attributes (size, aspect ratio, alignment, border, etc.), when display dimensions change, the image has to adjust both its height and width to maintain its aspect ratio.

The second component is a content relationship definition. As content elements become floating and loose discrete coordinates on pages, they maintain relative locality inter-relationships to keep correct sequence and proper layout on pages. There are two types of relationships: sibling-sibling and parent-child relationships. Sibling relationship represents sequence relativity (i.e. when n-elements are siblings, the first sibling comes first in the content sequence then the next one and so forth). On the other hand, the parent-child relationship implies container-containee relationship (figure element is the parent; it contains an image element and a text element). The third component is the content entity-relationship database engine. Fourth is dynamic layout engine.

Figure 6A:
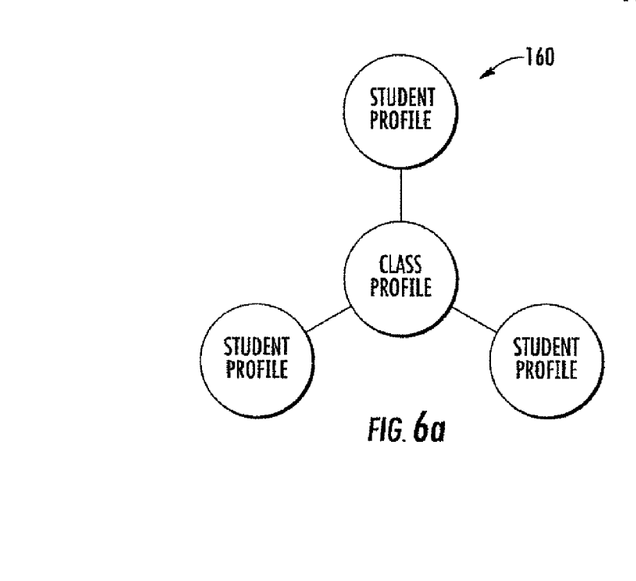
FIGS. 6(a) and 6(b) are network graphs before and after establishing relationships between different networks users in accordance with an example implementation of a digital textbook computing system, respectively.
Figure 6B:
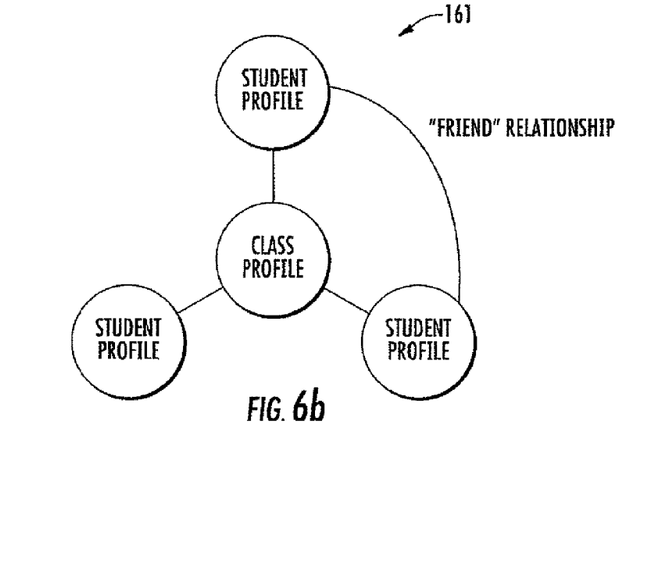

Social networking sites typically have these three defining characteristics: profile, traversable social network and public comments. In the social media platform within the digital technical textbook, every student may have a profile that will include some personal and demographical data, interests, and the current status update. The "class profile" is essentially the common profile for all students to post public comments. The instructor may administer the class profile. The profiles are the nodes in the network graph. The edges define the "friend" relationship between the nodes. The connectivity in a graph in general and in a social network graph in particular is important. In order to determine the connections, the network graph will be traversed using temporary tables in the database. The nodes in the network graph will initially be connected to the "class" node. New edges are created via "friend" or follow relationships. The edges can be directed, one student following the other student, or undirected, friends-both follow each other. The new edges indicate the formation of the new sub groups. FIGS. 6(a) and 6(b) illustrate the initial network graph 160 and the network graph 161 after a new "friend" relationship is defined respectively. Both the profiles and the edges that define the relationships between the profiles may be stored in tables in a relational database.

Every profile may have a field, "wall", where others may post comments. Each student may post a comment on his/her own wall as well as on their friends' walls. In addition, students may be provided with a communication media to chat with each other online within this framework.

The platform may provide a Wiki-like functionality to allow students to contribute to the content of the digital technical textbook, either through ordinary use such as comments and feedback, or by providing material to be published in the book. The content provided by the students may be evaluated both by other students and the instructor. The content that was found to help improve the current content of the textbook may either be added or replace a part of the textbook. This will allow the content of the textbook to always be up-to-date with more current and clearer information. This information will guide the instructor to clarify and refresh the current content and construct new content. Users may have the ability to contribute by either providing content or feedback on the textbook content and the other user provided content. Comments, user feedback and the user provided content may be stored in corresponding tables in the database shall be displayed on the user interface.

Gamification refers to applying game-like techniques to promote user engagement to desired nongame activities. Games can increase the learning by 7-40%. M. J. Mayo: Video Games: A Route to Large-Scale STEM Education?", Science. 2009. Including some of the game techniques such as rewards, recognition for contribution motivates students to engage in learning activities. J. Schell, ESOMAR Congress 20 II. Students will have the ability to customize their learning goals within the curriculum and receive feedback from their peers as well as their instructor and receive recognition for their progress. The digital textbook may include various reward mechanisms to gamify this platform for better student engagement: "Like" functionality which is similar to "Like" in Facebook, and "badges" which signifies the level of recognition for contribution. The first reward mechanism is a basic level peer-to-peer feedback on a particular post or comment. The second one is a broader recognition based on level and depth of a user's contribution and involvement in the textbook content. For example, number of comments a user posts to clarify or to answer another user's question, or to provide further information as well as the quality of the contribution evaluated by both peers and the instructor will be tracked by the software and used to determine the value added by that user. The user contributions and the evaluations may be stored in the database. The decision on the level of recognition is calculated in the application layer based on these data. Badges that the users receive may be displayed on the web application interface for recognition. The ultimate level of recognition may be becoming one of the authors of the textbook by providing highly rated content to become part of the textbook main content, not just a comment or a feedback.

The content of the web application interface may have role based access control (RBAC). The users, user groups and the roles are defined in the database for better efficiency of the RBAC. The content of the user interface and functionalities available for that user may be controlled by the user and its role definitions in the database.

Figure 7:
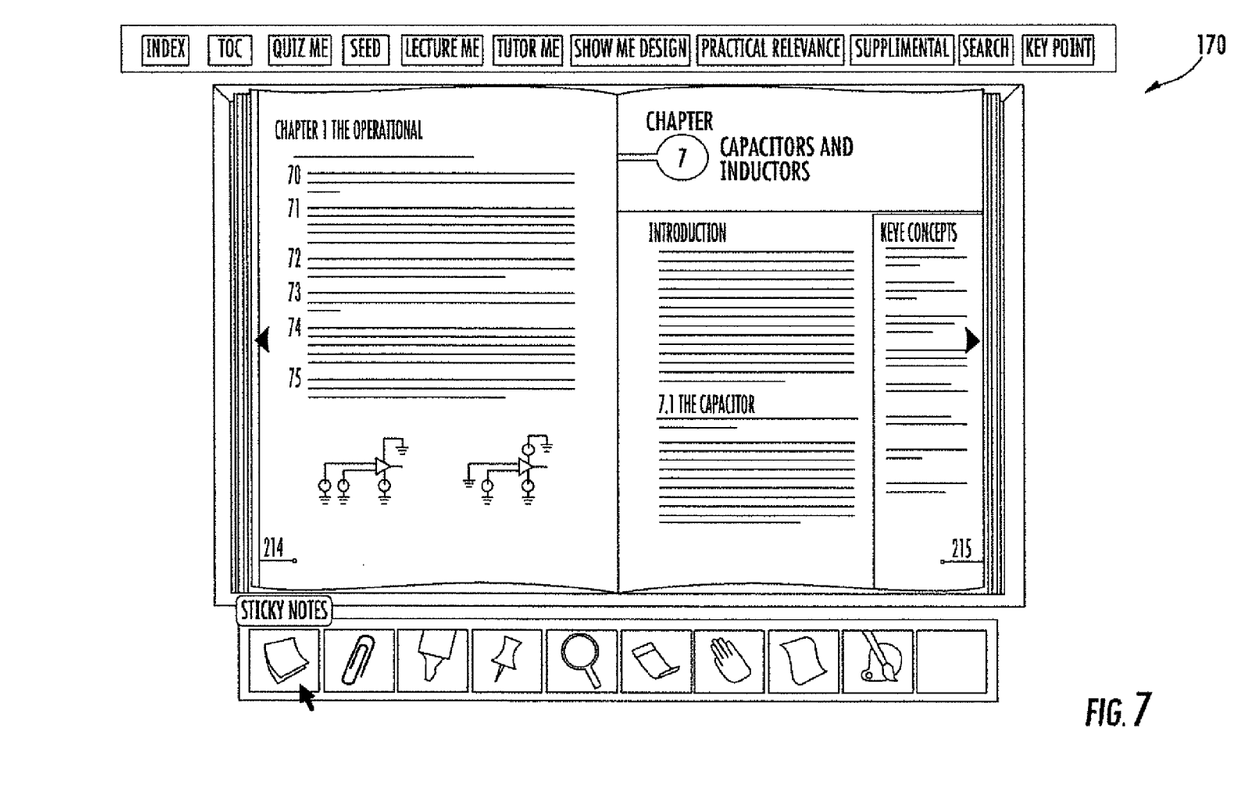
FIG. 7 is a screen shot illustrating an example digital textbook on the display of a computing device in accordance with an embodiment.

A screenshot 170 of the example digital book "Electronic Circuit Analysis" is shown in FIG. 7, and may have various features. One option is to sustain the classical book's look and feel in the proposed eBook. The Book screen may show a simple two-frame window loaded with papers that may be flipped forward, backward, and out-of-sequence toward a predefined marker. Therefore, this eBook allows the reader to navigate forward and backward, or toward a predefined marker, such as a bookmark, highlight indexed word, search hit, etc.

A dynamic index with hyperlinks feature allows the user to add indexed words to the author provided index by right clicking on any word within the text and adding that word to the index. The user may then invoke the index feature to view any of the indexed words in the Digital Book. He may directly navigate to the desired location by simply clicking the hyperlink of the particular occurrence.

The digital book may provide advanced search capabilities to mitigate the effect of having enormous amounts of material for the student to browse through, with many difficulty levels and many solution conventions and techniques. The search feature may be invoked from a Book toolbar. The search screen has a List View that contains the section/chapter of all hits, along with the context of each hit to give the users a clue if this is what they are looking for. Once the users double click on any hit, the digital book will open the page that contains that hit and highlight its occurrence.

The digital book may also be able to read its "viewable" content dynamically from the current Table of Content (TOC) Profile. This profile may be loaded by default at the launch of the book; this profile may remain the default profile unless the user wants to change it. The user may customize the profile by adding/removing material (sections or whole chapters) from the viewable content, the profile will be updated accordingly, and the updated TOC will reflect the user changes. Profiles may be imported and exported to support the distribution of text books tailored for a particular course outline.

The right and left frame may be divided into equal separators, each representing a chapter from the book. When the user hovers the mouse over that region, the book will then pop-down a list of sections of that chapter. The sections are clickable and allow fast access to book content. This feature will allow the users to navigate to any topic regardless of their navigation position and without the tedious task of locating a certain section/chapter in an actual book.

Because the book is highly interactive with continually randomized values for the examples, drill problems, practical and design examples, quizzes, and end-of-chapter problems, values may be used consistently through the different runs/users when needed. As a result, the book may allow the user to input a seed value to control the randomization of all the values throughout the book. This feature is very helpful to instructors who want all students to study the same content (assigned numerical values) and tackle the same problems.

Because users might need to keep part of a page opened and visible but at the same time navigate through the other pages to see related content, the users may select the page they want to keep visible to float on top of the book. Floating pages may be saved in the database for later use when needed.

The digital book may support predefined themes that fit different moods and personalities. For example, the classical book theme uses black-white-gray degrees. Other modern themes can be used for young students or even kids. The customized color themes will support dynamic color and font changes. Also, students may use a "hand" icon to hide any part of the page so they can memorize, review, or recall the hidden content.

A clock may run in the background to estimate the time spent on each section as a sort of student assessment. According to this assessment, the level of the quiz problems generated by the QUIZME add-on can be affected.

The page will be constructed with multiple layers containing an analysis of a topic with different difficulty levels and different methods of solving the same problem in a given level. The purpose is to give flexibility to the user and benefit a large diversity of students as far as the level of their understanding of the material and to see how a given problem is being solved. At any point during the analysis, the user can switch to a different difficulty level problem by a click of a button.

The user may bookmark any content in the material (text, figure, circuit, equation). The bookmarks may be organized in groups (baskets) where a group can be defined by the users to refer to logical grouping of their bookmarks.

The digital book may have plotting functionality embedded for equations. Students may plot selected equations on an interactive interface. They may change the variables of the plotted equation and see the effect of each variable by observing how the plot changes. Equations may be plotted by calculating the data points. The plotting object will be flexible and highly customizable in terms of the appearance and the technical options.

The social networking functionality may be organized around the four self-learning modules for the Social Digital Book. The four modules are TUTORME, QUIZME, Design and Practical Relevance module.

TUTORME is a tutoring tool to help students to learn key concepts outside the classroom. G. Haddad, G. Gamboa, and I. Batarseh, "Interactive electrical circuit tutoring tool-eTutor," ASEE Southeast Conference, 2008. This tool provides effective strategies to learn, retain, and apply concepts a unique interactive learning style using materials that combine graphics with personalized feedback that will allow students to understand and correct their mistakes without the instructor's presence. This is particularly beneficial for large class sizes where personalized student-instructor interaction during the classroom hours is difficult. Because students learn at different paces, it is difficult for a professor to evaluate effectively the comprehension level of each student. With the TUTORME tool, students may solve problems and obtain the same type of specific feedback they would receive from the class instructor. An effective feature of the Tutor Me tool is that it is highly interactive, as it provides personalized feedback to pinpoint the specific errors made by the students. Furthermore, this module may be enhanced by the social media component to expand the interactivity between user and the digital book to user and other users.

Figure 8:
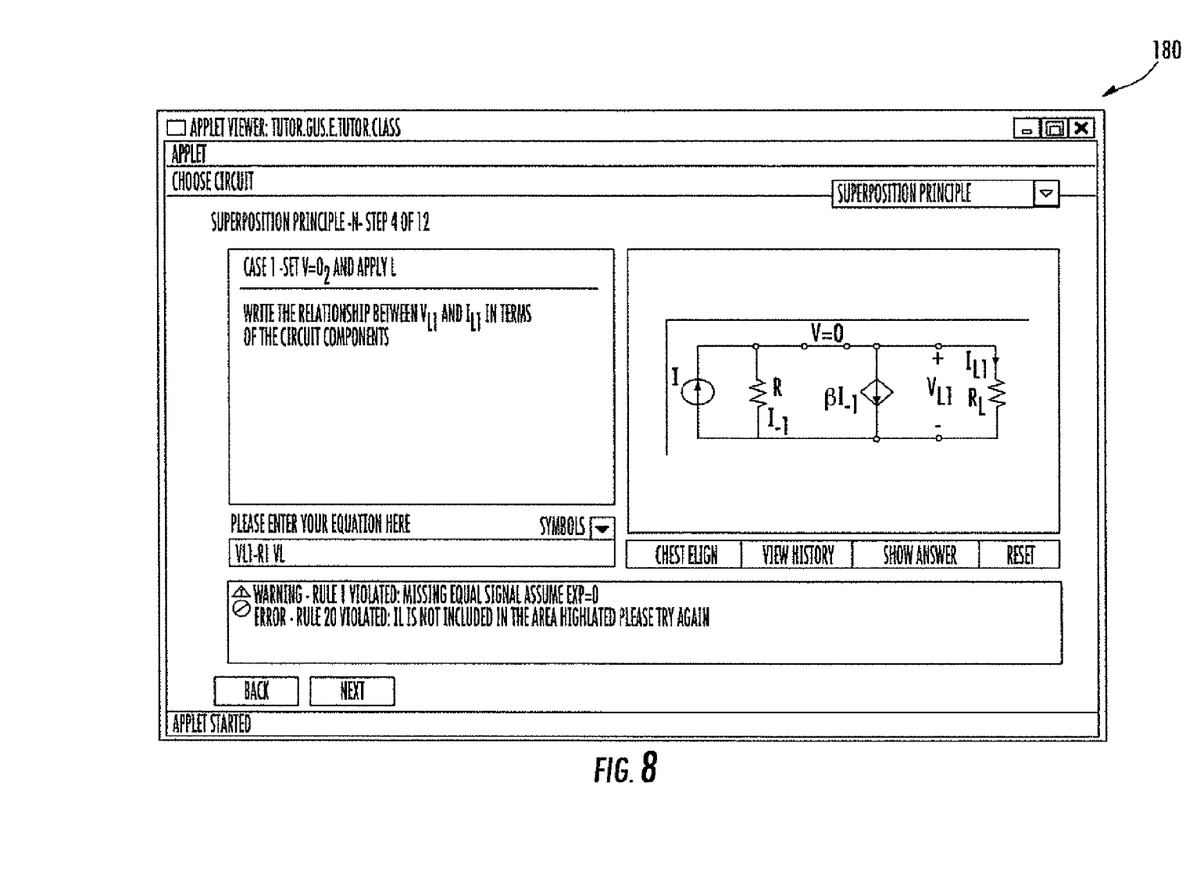
FIG. 8 is a screen shot illustrating a tutoring module of the digital textbook on the display of a computing device in accordance with an example embodiment.

The Graphical User Interface (GUI) may include a collection of screens that serve as a platform for interaction between the student and the TUTORME tool. GUI components for the TUTORME problems may show any selected problem and maximize interactivity between the tool and the user. The GUI takes the user input and passes it to the processing component. Upon processing the output, the GUI receives the results and displays it to the user. FIG. 8 shows the TUTORME main GUI interface screen 180. The user may be guided through the following steps in order to use the system.

The Database Interface is responsible for database interaction. The TUTORME tool may connect to two different databases: a local database at the computing device that includes the problems and the associated steps, and a remote database at the server to collect users' answers and perform results analysis. Activated by using a certain switch, the tool can perform authentication and actions logging for each user on a remote database. This option will allow the authors to collect valuable information on how users react to certain problems and, as a result, fix the presentation of those problems.

The processor of the computing device receives the input equation from the GUI and applies a multi-step algorithm to process the correctness of that equation. The results (set of errors and/or warnings) are then sent back to the GUI so that the user can view them.

The equation solver generates the numerical solution for the circuit. After the users finish solving the problem symbolically, the tool prompts them whether they want to get numerical answers. The numerical solver allows the users to enter their own numerical values for each element in the circuit. Then it uses the set of equations for that specific circuit to solve the problem numerically. The calculated values change promptly when the user changes the value of any element in the circuit.

The QUIZME module is an interactive, user-friendly, quizzing tool that helps students individually take quizzes online to learn, practice, and evaluate their performance. "Development of modular interactive learning and assessing tools for electrical circuit core courses for engineering students", Issa Batarseh and Kalpathy B. Sundaram, 20 II CCLI/TUBS Conference, Jan. 26-28, 2011, Washington D.C. In addition, this tool may provide feedback for the instructors about the student performance. This tool facilitates self-testing to ensure better understanding in the analysis of electric circuit problems. The module allows the student to choose a section of interest, and then it presents certain number of problems from that section for the student to solve. At the end of the quiz, the tool displays a feedback in the form of a report with the student's grade, a list of questions correctly and incorrectly answered, and an option to retake the quiz. This reporting mechanism serves as a feedback to the student to know their level of understanding in that particular section. An objective of this module is to present a user-friendly tool for students to effectively learn, practice, and apply their understanding in the subject.

The QUIZME module may include a QUIZME database, the QUIZME rules manager, and the Graphical User Interface. The QUIZME database stores information about all the questions, including sections, difficulty levels, answer choices, correct answers, and the associated circuit diagrams (in the case of an electronics book). The QUIZME rules manager incorporates the logic of quiz formation. Each quiz is constructed following a predefined set of rules that define difficulty levels, question types (numerical or symbolic), and question topic. The rule manager fetches a set of questions from the QUIZME database and apply the selection criteria to pick the most qualified questions.

The Design module includes a collection of problems (electrical circuit problems in the present example). Each design problem will be done four times at different levels. This may allow students at all academic levels to get exposed to the same electrical circuit concepts at the difficulty level they can comprehend. The purpose is to cover a large diversity of students as far as the level of their understanding of the material. At any point of the analysis, the student may switch to a higher or lower difficulty level problem. "Importance of practical relevance and design modules in electrical circuits education", R. A Amarin, K. B. Sundaram, A. Weeks, and I. Batarseh, 2011 IEEE Global Engineering Education Conference, EDUCON 2011, Apr. 4-6, p 792-794.

The Practical Relevance module may enable students to interactively learn STEM or other concepts through practical applications of the theory. The practical relevance exercises may be dynamic with animation features and the ability for students to enter various values for formulas, which in turn will be dynamically used to convey a variety of results for the specific topics. The Practical Relevance module provides STEM students with an understanding of the practical application of the abstract theories by solving real-world examples and problems. Moreover, the Practical Relevance module may be highly interactive with illustrated animations. The module may present real-world applications, relate the application to the scientific theory being studied, relate the application to a real product in the market, and provide an interactive applet to show how the application (device) works under different parameter variations.

Further details regarding example electronic book features which may be incorporated in the system described above may be found in U.S. Pat. No. 8,352,876 to Batarseh et al., as well as U.S. Pat. Pub. Nos. 2013/0177892, 2013/0179823, 2016/0027315, 2016/0027316, and 2016/0026351 also to Batarseh et al., which are assigned to the present Assignee and are all hereby incorporated herein in their entireties by reference.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A method comprising:
    storing electronic textbook data on at least one server, the electronic text book data including a plurality of objects with respective unique object identifiers (IDs;
    at a plurality of computing devices each comprising a display, a memory, a user input device, and a processor, wherein the memory further comprises at least a forward-skewed cache, using the processor to:
        display the electronic textbook data on the display, and receive comment data from a respective user of the computing device with respect to the electronic textbook data, and provide the comment data to the at least one server;
    at the at least one server, distributing the comment data among all of the plurality of computing devices;
    at the processor of each computing device, receiving a respective user rating for the distributed comment data and providing the user rating to the at least one server; and
    at the at least one server, permanently incorporating given distributed comment data into the electronic textbook data when the user ratings for the given distributed comment data reach a rating threshold;
    at the processor of each computing device, determining CurrentObjectID>FirstObjectID+ (CacheSize*FCThreshold),
    where CurrentObjectID is the ID of a current object being browsed from the cache, FirstObjectID is the ID of a first object in the cache, CacheSize is the total number of objects in the cache, and FCThreshold is a forward caching threshold ahead of the CurrentObjectID;
    in response to the determining, the processor of each computing device downloading, from the at least one server, a portion of the objects in the forward direction of the electronic textbook data into in the forward-skewed cache of the memory, wherein the portion of the objects includes more objects in a forward browsing direction than a backward browsing direction and wherein the forward skewed cache maintains a caching window around the current object that retains a pre-defined dimension.

2. The method of claim 1 further comprising, at the at least one server, storing the user comments and associated user rating in a database and calculating respective levels of recognition for the users based upon their stored user comments and the associated user ratings.

3. The method of claim 1 further comprising:
    at the processor of each computing device, providing a location within the electronic textbook data being displayed on the display to the at least one server;
    at the at least one server, sharing location information among all of the plurality of computing devices; and
    at the processor of each computing device, displaying an indicator to a respective user of other users currently viewing the same location on other computing devices.

4. The method of claim 1 wherein the electronic textbook data is organized in an object tree with parent objects and respective child objects under each parent object.

5. The method of claim 4 wherein the child objects are further organized in a style tree for a plurality of different styles, with child objects from different parent objects sharing a same style.

6. A computer system comprising:
    at least one server for storing electronic textbook data, the electronic text book data including a plurality of objects with respective unique object identifiers (IDs); and
    a plurality of computing devices each comprising a display, a memory, a user input device, and a processor, wherein the memory further comprises at least a forward-skewed cache, the processor configured to:
        display the electronic textbook data on the display, and receive comment data from a respective user of the computing device with respect to the electronic textbook data, and provide the comment data to the at least one server;
    the at least one server being configured to distribute the comment data among all of the plurality of computing devices;
    the processor of each computing device being configured to receive a respective user rating for the distributed comment data and provide the user rating to the at least one server;
    the at least one server being configured to permanently incorporate given distributed comment data into the electronic textbook data when the user ratings for the given distributed comment data reach a rating threshold;
    the processor of each computing device further being configured to determine CurrentObjectID>FirstObjectID+ (CacheSize*FCThreshold),
    where CurrentObjectID is the ID of a current object being browsed from the cache, FirstObjectID is the ID of a first object in the cache, CacheSize is the total number of objects in the cache, and FCThreshold is a forward caching threshold ahead of the CurrentObjectID;
    in response to the determination, the processor of each computing device downloading, from the at least one server, a portion of the objects in the forward direction of the electronic textbook data into in the forward-skewed cache of the memory, wherein the portion of the objects includes more objects in a forward browsing direction than a backward browsing direction and wherein the forward skewed cache maintains a caching window around the current object that retains a pre-defined dimension.

7. The computer system of claim 1 wherein the at the at least one server is further configured to store the user comments and associated user ratings in a database and calculate respective levels of recognition for the users based upon their stored user comments and the associated user ratings.

8. The computer system of claim 1 wherein the processor of each computing device is further configured to provide a location within the electronic textbook data being displayed on the display to the at least one server; wherein the at least one server is configured to share location information among all of the plurality of computing devices; and wherein the processor of each computing device is configured to display an indicator to a respective user of other users currently viewing the same location on other computing devices.

9. The computer system of claim 1 wherein the electronic textbook data is organized in an object tree with parent objects and respective child objects under each parent object.

10. The computer system of claim 9 wherein the child objects are further organized in a style tree for a plurality of different styles, with child objects from different parent objects sharing a same style.

11. The computer system of claim 10 wherein the different styles comprise at least one of textbook example styles, textbook problem styles, and textbook figure styles.

12. The computer system of claim 1 wherein the processor only downloads objects to the forward-skewed cache when a user is reading previously rendered electronic textbook data.

13. The computer system of claim 1 wherein the processor is further configured to determine $$CurrentObjectID < FirstObjectID + (CacheSize * BCThreshold),$$

where CurrentObjectID is the ID of a current object being browsed from the cache, FirstObjectID is the ID of a first object in the cache, CacheSize is the total number of objects in the cache, and BCThreshold is a backward caching threshold behind the CurrentObjectID.

14. A non-transitory computer readable medium including instructions that, when executed by a processing device, cause the processing device to perform operations comprising:
storing electronic textbook data on at least one server, the electronic text book data including a plurality of objects with respective unique object identifiers (IDs;
at a plurality of computing devices each comprising a display, a memory, a user input device, and a processor, wherein the memory further comprises at least a forward-skewed cache, using the processor to:
display the electronic textbook data on the display, and
receive comment data from a respective user of the computing device with respect to the electronic textbook data, and provide the comment data to the at least one server;
at the at least one server, distributing the comment data among all of the plurality of computing devices;
at the processor of each computing device, receiving a respective user rating for the distributed comment data and providing the user rating to the at least one server; and
at the at least one server, permanently incorporating given distributed comment data into the electronic textbook data when the user ratings for the given distributed comment data reach a rating threshold;
at the processor of each computing device, determining
$$CurrentObjectID > FirstObjectID + (CacheSize * FCThreshold),$$
where CurrentObjectID is the ID of a current object being browsed from the cache, FirstObjectID is the ID of a first object in the cache, CacheSize is the total number of objects in the cache, and FCThreshold is a forward caching threshold ahead of the CurrentObjectID;
in response to the determining, the processor of each computing device downloading, from the at least one server, a portion of the objects in the forward direction of the electronic textbook data into in the forward-skewed cache of the memory, wherein the portion of the objects includes more objects in a forward browsing direction than a backward browsing direction and wherein the forward skewed cache maintains a caching window around the current object that retains a pre-defined dimension.

15. The non-transitory computer readable medium of claim 14 further comprising storing the user comments and associated user ratings in a database and calculating respective levels of recognition for the users based upon their stored user comments and the associated user ratings.

16. The non-transitory computer readable medium of claim 14 further comprising receiving a location within the electronic textbook data being displayed on the respective display of each computing device, and share location information among all of the plurality of computing devices based upon the received locations.

* * * * *